(12) United States Patent
Schoene

(10) Patent No.: US 7,624,946 B2
(45) Date of Patent: Dec. 1, 2009

(54) RESERVOIR FOR CRYOGENIC FUELS AND VEHICLES

(75) Inventor: Wolfram Schoene, Buxtehude (DE)

(73) Assignee: Airbus Deutschland GmbH, Hamburg (DE)

( * ) Notice: Subject to any disclaimer, the term of this patent is extended or adjusted under 35 U.S.C. 154(b) by 581 days.

(21) Appl. No.: 11/092,307

(22) Filed: Mar. 29, 2005

(65) Prior Publication Data

US 2005/0230554 A1 Oct. 20, 2005

Related U.S. Application Data

(60) Provisional application No. 60/606,802, filed on Sep. 2, 2004.

(30) Foreign Application Priority Data

Mar. 30, 2004 (DE) .................. 10 2004 015 319

(51) Int. Cl.
*B64D 37/02* (2006.01)
(52) U.S. Cl. ............... 244/135 R; 244/172.3
(58) Field of Classification Search ............. 244/172.3, 244/172.2, 135 R, 118.5
See application file for complete search history.

(56) References Cited

U.S. PATENT DOCUMENTS

| | | | | |
|---|---|---|---|---|
| 3,243,150 A | * | 3/1966 | Woodcock | 244/135 R |
| 3,473,343 A | * | 10/1969 | Chamberlain | 62/46.1 |
| 3,785,321 A | | 1/1974 | Backstrom | |
| 3,788,039 A | * | 1/1974 | Bragg | 96/174 |
| 3,850,001 A | * | 11/1974 | Locke | 62/47.1 |
| 5,090,637 A | | 2/1992 | Haunschild | |
| 5,862,670 A | * | 1/1999 | Lak | 62/7 |
| 5,975,466 A | * | 11/1999 | Kahara et al. | 244/135 R |
| 6,019,316 A | * | 2/2000 | Sarlin et al. | 244/135 R |
| 6,374,618 B1 | * | 4/2002 | Lak | 62/50.1 |
| 6,634,598 B2 | * | 10/2003 | Susko | 244/135 R |
| 6,830,219 B1 | * | 12/2004 | Picot et al. | 244/135 R |
| 2002/0179610 A1 | | 12/2002 | Fraklin, III et al. | |

FOREIGN PATENT DOCUMENTS

DE OS 21 58 020 5/1972

\* cited by examiner

*Primary Examiner*—Tien Dinh
(74) *Attorney, Agent, or Firm*—Christopher Paradies; Fowler White Biggs P.A.

(57) ABSTRACT

A reservoir safely accommodates a fuel using a barrier layer, which at least partly separates the contact areas of the reservoir and/or contact elements to be protected. The barrier layer is formed of a fire-proof medium which displaces volatile and ignitable fuel having a density less than the density of the fire-proof medium, providing a chemical-physical separation of hydrogen from the air surrounding the reservoir. In vehicles, particularly aircraft, safe operation may be improved by application of the barrier in the reservoir. In one embodiment, there is an additional reservoir filled with an inert material that surrounds the hydrogen reservoir.

15 Claims, 2 Drawing Sheets

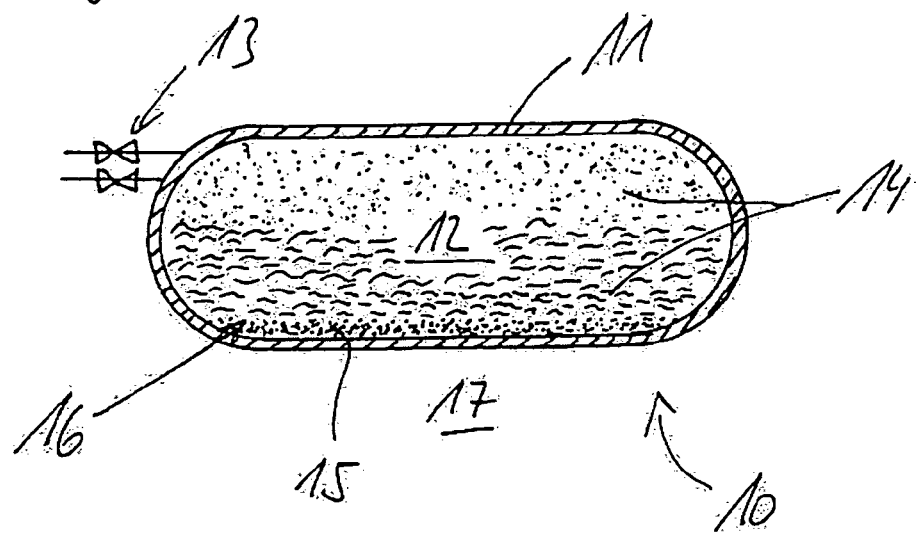
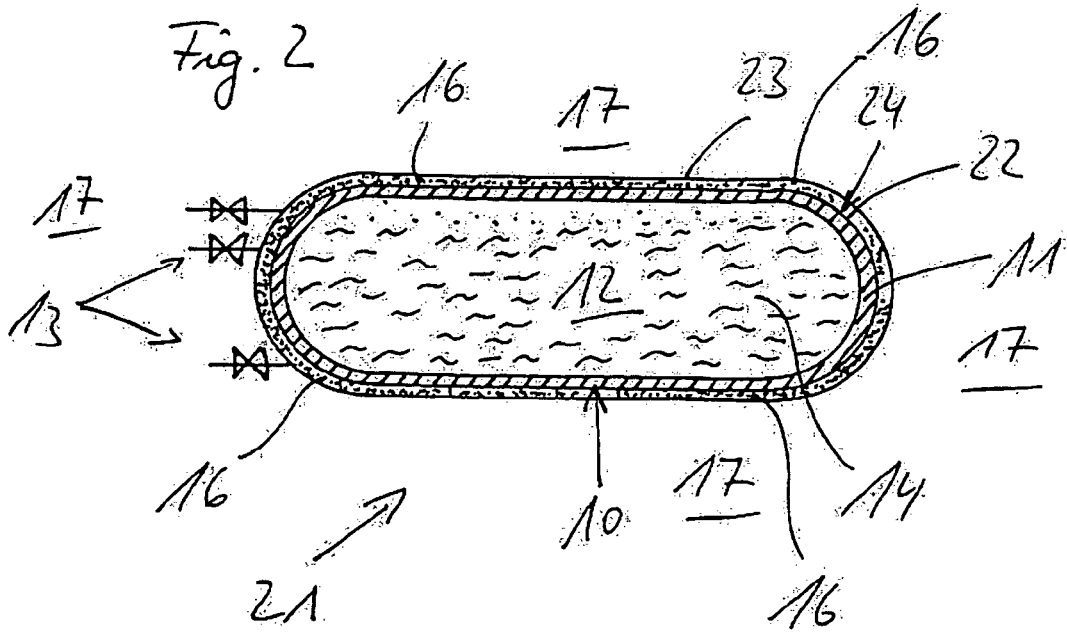

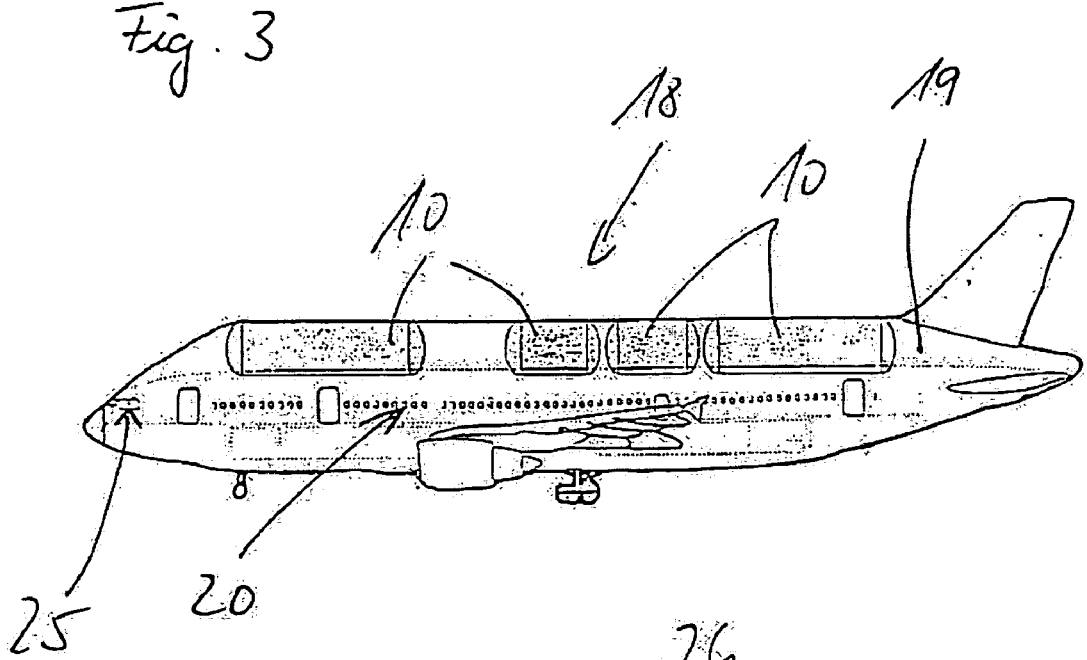
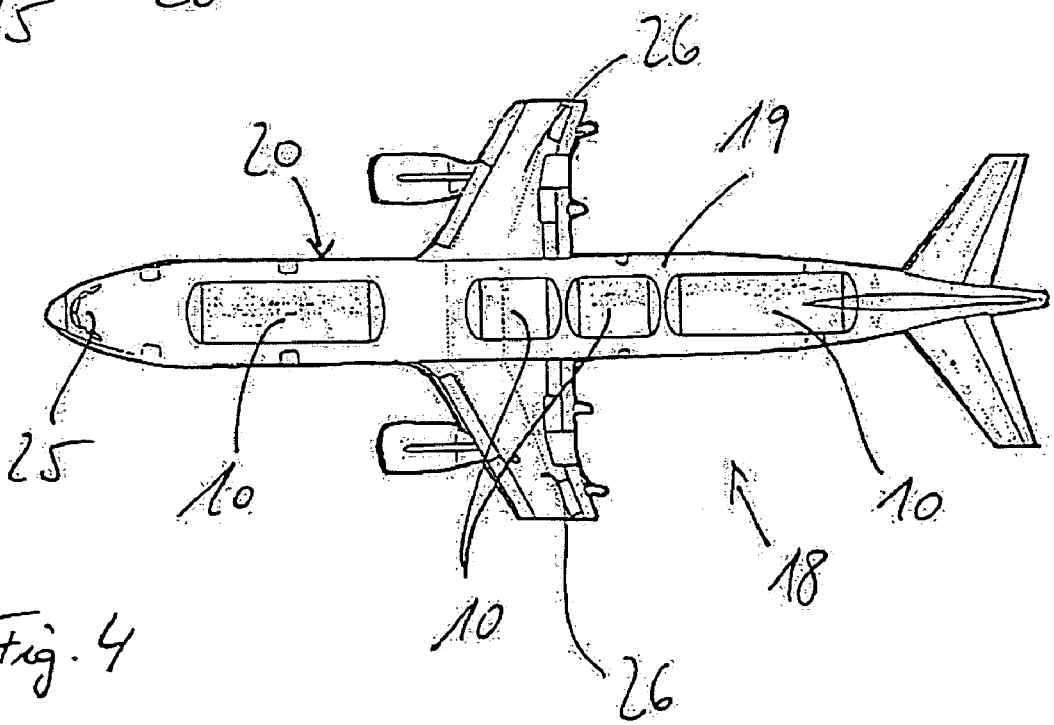

RESERVOIR FOR CRYOGENIC FUELS AND VEHICLES

CROSS-REFERENCE TO RELATED APPLICATIONS

This application claims the benefit of U.S. Provisional Application No. 60/606,802 filed Sep. 2, 2004 and German application 10 2004 015 319.1, filed Mar. 30, 2004, which are both incorporated herein in their entirety, by reference.

FIELD OF THE INVENTION

The field relates to a reservoir for alternative fuels for aircraft. More specifically, the field includes reservoirs having sealable storage volumes for receiving and accommodating cryogenic fuels such as hydrogen, in vehicles, such as aircraft.

BACKGROUND

Fuel storage tanks on vehicles usually serve for storing fuels that are delivered to engines that power vehicles. For example, airplanes are usually driven or propelled by kerosene which is stored in wing and mid-section tanks. It is increasingly desirable and necessary to use alternative forms of energy. The increasing awareness of the environmental impact of engine exhaust on sensitive regions of the atmosphere by aircraft engines, and, in connection therewith, the strengthened regulations for limiting emissions of pollutants, require a search for alternative fuels. Also, the availability of fossil fuels produced from oil is limited and exhaustible. Therefore, it is essential to develop alternative fuels, such as cryogenic fuels. Cryogenic fuels are gaseous at room temperature, but become liquid at very low temperatures and/or high pressures. Liquified hydrogen and liquified natural gas have proven particularly suitable. Since the use of hydrogen is particularly friendly to the environment and may be generated from water, for example, by means of solar energy or wind energy, hydrogen is a focus for development by the aviation industry.

For receiving and storing cryogenic fuels, special safety provisions are required. Hydrogen, especially in the gaseous state, shows a high reactivity with respect to oxygen and other oxidizers. This means, that contact of hydrogen with oxygen contained in the air may lead to an unwanted reaction in the form of a deflagration, ignition, explosion or the like. Known storage tanks are insufficient to safely separate hydrogen from its surrounding with the necessary reliability. Furthermore, known fuel tanks are usually not fire-proof and provide insufficient protections against ignition of fuel. Particularly in the case of hydrogen, there exists the danger that fuel in the surrounding hydrogen tanks will be ignited causing a fire to spread in an uncontrolled way. Thus, known fuel storage tanks present an unacceptable safety vulnerability, particularly when disposed in an operating airplane.

It would be desirable to have a cryogenic storage reservoir for fuels such as hydrogen that prevents contact with oxygen and inhibits the spread of fire.

SUMMARY OF THE INVENTION

According to an exemplary embodiment of the invention, a reservoir prevents vapors of a cryogenic fuel and the cryogenic fuel, itself, from contact with electrical elements, contact areas, contact elements, oxygen and other oxidizers using a barrier layer formed of a fire-proof fluid medium which has a density greater than the density of the cryogenic fuel. Separation of the cryogenic fuel, such as hydrogen, from the surroundings to be secured, such as critical contact areas, including: structural components of airplane cabins, cables at risk of short circuit, hot or mechanically endangered components which are positioned close to the surrounding and load bearing structures, is ensured by the barrier layer, providing for safer operation. In one embodiment, a reservoir according to the invention is substantially based on known reservoirs such that retrofitting of cryogenic storage tanks may be achieved with little effort, improving safety with only a marginal increase in weight.

According to an exemplary embodiment of the invention, a universally applicable and simple reservoir is provided which provides for an easy and safe separation between cryogenic fuels on the one hand, and critical contact areas and/or contact elements, on the other hand. According to another exemplary embodiment of the invention, a vehicle powered by cryogenic fuels is provided which has a high safety standard, particularly with respect to fire safety.

In one embodiment, the barrier layer is formed of helium Due to the difference in density of helium to hydrogen, a barrier layer of helium is formed below the hydrogen fuel. Herein, below refers to the direction of gravity, and gravity causes the more dense fluid to settle to the bottom of the reservoir such that all regions lying below the fire-proof helium are reliably separated from the hydrogen fuel. Due to this reason, such reservoirs are particularly well suited for being arranged in aircraft which have the reservoirs arranged in the body of the aircraft above the passenger cabin.

In another embodiment, cryogenic fuel is surrounded by a fluid barrier layer. Thereby, critical contact areas laterally of and/or above the fuel reservoir are separated from the cryogenic fuel, also. The storage volume for the cryogenic fuel may be completely encapsulated with respect to its surroundings by a chamber filled with an inert gas which further enhances the safety level.

A vehicle may be provided having one or more of the cryogenic reservoirs of the present invention. Thereby, the operation of a vehicle with an improved safety is ensured, since the cryogenic fuel is separated reliably from the surroundings to be secured. The use of the barrier fluid protects the surroundings even in case of a fire, since the fire may be prevented from affecting the regions protected by the barrier layer.

BRIEF DESCRIPTION OF THE DRAWINGS

Further exemplary features and embodiments of the invention follow from the detailed description. Exemplary embodiments and fields of application will be further described by reference to the accompanying drawing(s). In the drawing(s):

FIG. 1 is a sectional side view of a first embodiment of a reservoir.

FIG. 2 is a sectional side view of a further embodiment of the reservoir.

FIG. 3 is a side view of an aircraft having reservoirs disposed in the body of the airplane above the passenger cabin.

FIG. 4 is a side view of the aircraft according to FIG. 3.

DETAILED DESCRIPTION OF EXEMPLARY EMBODIMENTS

The reservoirs shown in the drawings serve for storing cryogenic fuels in aircraft, such as airplanes, but the reservoirs according to the present invention may be applied in other fields, such as construction of passenger cars and trucks, as well as other vehicles. The reservoirs shown are applicable to fuel storage wherever cryogenic fuels are used, for any and all purposes whatsoever, when the fuel should be separated from surroundings to be protected. For example, critical contact areas and/or contact elements, such as, structural components of aircraft cabins, electrical wiring, heated or mechanically endangered components, and other load bearing components may be separated from the fuel by a fluid barrier.

The reservoir 10 shown in FIG. 1 is a cylindrical tank. The tank may have any shape such as spherical or other shape. The tank has a wall 11, which may be closed in order to form a storage volume 12 or compartment, accommodating room for cryogenic fuel. The wall 11 may comprise one layer or several layers. Further, the reservoir 10 possesses all ordinary elements 13, which are only schematically indicated in FIG. 1, as for example control and/or regulation elements, and/or elements for filling and emptying as well as venting the accommodating room of the storage volume 12, as well as pumps and the like.

Within the accommodating room of the storage volume 12, there is cryogenic fuel. Such reservoirs 10 may be filled with hydrogen 14. In the figure, hydrogen 14 exists primarily in liquid form ($LH_2$, indicated by wavy lines). The empty space above the liquid hydrogen 14 is filled with gaseous hydrogen 14 (indicated by dots). In addition to the hydrogen 14, a medium heavier than hydrogen 14 is present in the storage volume 12. This medium preferably may be a noble gas, also referred to as an inert gas whether in gaseous or liquid state, such as helium (He) 15. Helium 15 is substantially heavier (denser) than hydrogen 14, so that the whole (liquid and gaseous) portion of hydrogen is collected in the accommodating room of the storage volume 12 above the mass of helium 15 fluid. Therefore, the fire-proof helium 15 forms a barrier 16 between hydrogen 14 and the surroundings 17, which are positioned opposite of the helium 15. On the other hand, the barrier 16 may separate hydrogen 14 from components (not shown) or the like that are positioned on the opposite side of the barrier 16 from the hydrogen and within the storage volume 12.

The reservoir 10 shown in FIG. 1 is particularly suitable for use in aircraft 18 in which the cryogenic fuel is disposed in reservoirs 10 in the region of a body or fuselage 19 above the passenger cabin 20 such as shown in FIGS. 3 and 4. Several reservoirs 10 may be disposed in a row. The barrier fluid 16 chemically and physically separates the hydrogen 14 in the reservoir 10 from critical contact areas such as structural components of the body 19. Even in case of ignition and burning of the hydrogen 14, the ignited fuel will burn upwards and the region below the barrier 16 will be isolated from the flames.

In case that the fluid barrier 16 that forms due to a mixture of hydrogen and helium is not sufficiently effective as a barrier, then an alternative embodiment provides for a barrier surrounding the fuel storage area For example, since critical contact elements and/or contact surfaces may be, for example, disposed laterally or above the hydrogen 14, a reservoir 21 may possess an additional chamber 22, as shown in FIG. 2. To this end, a reservoir 10, such as shown in FIG. 1, is completely surrounded or encapsulated by an additional wall 23 which forms an external wall around the reservoir 10. Due to a gap between the external wall 23 and the reservoir wall 11, an additional storage volume is formed, providing room for accommodating a fluid. In this storage volume 24, there may be an inert fluid 16 in addition to the fluid barrier 16 shown in FIG. 1 or, alternatively, replacing the fluid barrier 16 entirely. Thereby, a protective barrier layer 16 is formed surrounding the hydrogen chamber 10. This provides for the combined chemical-physical and mechanical separation of hydrogen fuel from the surroundings. In FIG. 2, the storage volume 12 is filled with hydrogen 14, which, to a major degree, is present in liquid form (indicated by wavy lines) and in small parts in gaseous form (indicated by dots). Optionally, in the storage volume 12, there may still be helium 15 which forms an additional barrier layer 16 below the hydrogen 14. In the additional storage volume 24, helium 15 (indicated by dots) is mainly present in liquid form, but selectively also in gaseous form or in form of a liquid/gaseous mixture.

Alternatively or supplementary to the positions of the reservoirs 10, 21 in an aircraft 18 that are shown in FIGS. 3 and 4, reservoirs 10, 21 may be disposed in the front area of the vehicle body (e.g., fuselage) as well, for example between cockpit 25 and passenger cabin 20, as well as in the region of the wings 26. The reservoirs 10, 21 may also be applied in space vehicles, in power plants or in the field of shipbuilding.

For example, the helium 15 may be introduced into the reservoir storage volume 13 together with the hydrogen 14, as a helium/hydrogen mixture. The helium 15 settles below the hydrogen 14, protecting any contact areas and/or contact elements to be protected. For example, electrical wiring, contacts and heat-producing elements may be located within the storage volume 12 below the barrier layer 16 formed by the helium 15 or any other fuel/barrier fluid combination that is immiscible and separates into at least two layers with one layer providing a protective chemically inert layer.

It should be noted that the term "comprising" does not exclude other elements or steps and the "a" or "an" does not exclude a plurality. Also elements described in association with different embodiments may be combined.

The invention claimed is:

1. A reservoir for cryogenic fuel for use in applications where physical or chemical separation of the fuel from contact areas or contact elements to be protected is desired, the reservoir comprising:
   a sealably lockable storage volume for receiving the fuel;
   a barrier fluid of a fire-proof medium having a density greater than the density of the fuel, wherein the fuel contained in the storage volume is separated, at least partially, from the contact areas or contact elements to be protected by a barrier layer formed of the barrier fluid; and
   an element coupled to the sealably lockable storage volume such that the element introduces the barrier fluid together with the fuel into the sealably lockable storage volume as a mixture of the barrier fluid and the fuel,
   wherein the reservoir is disposed in an area of a body of an aircraft;
   wherein the reservoir is adapted to be positioned above a passenger cabin.

2. The reservoir according to claim 1, wherein the barrier fluid is of a noble gas.

3. The reservoir according to claim 2, wherein the barrier fluid is of helium at least partially in the liquid state, and the fuel is of hydrogen.

4. The reservoir according to claim 3, wherein helium is introduced into the storage volume together with hydrogen, as a helium/hydrogen mixture.

5. The reservoir according to claim 3, wherein the barrier fluid creates a chemical and physical separation of hydrogen from the contact areas and contact elements outside of the storage volume by disposing the barrier fluid between a wall of the reservoir and the hydrogen contained in the storage volume.

6. The reservoir according to claim 1, wherein the fuel is of hydrogen and the barrier fluid is of helium, and hydrogen and helium are provided in liquid form, in gaseous form, or both liquid and gaseous forms in the storage volume.

7. The reservoir according to claim 1, wherein the fuel is surrounded by the barrier fluid.

8. The reservoir according to claim 7, wherein the storage volume is defined by a first wall and the first wall is completely encapsulated with respect to the surroundings by a second wall such that the storage volume is surrounded by an additional volume containing the barrier fluid.

9. The reservoir according to claim 8, wherein the additional volume between the first wall and the second wall is another storage volume and is filled with helium.

10. The reservoir according to claim 8, wherein the additional volume is sealable.

11. reservoir according to claim 1, wherein the barrier layer is an integral part of the reservoir.

12. The reservoir according to claim 1, wherein at least a portion of a structural component of aircraft cabin, electrical wiring, or a heated component is disposed within the storage volume below the barrier layer.

13. reservoir according to claim 12, wherein at least a portion of the heated component is disposed within the storage volume below the barrier layer.

14. reservoir according to claim 12, wherein the electrical wiring is disposed within the storage volume below the barrier layer.

15. A passenger aircraft having at least one reservoir according to claim 1.

* * * * *